Jan. 19, 1965 L. A. ROWE 3,166,267
SPINNING REEL
Filed Aug. 22, 1963 4 Sheets-Sheet 1
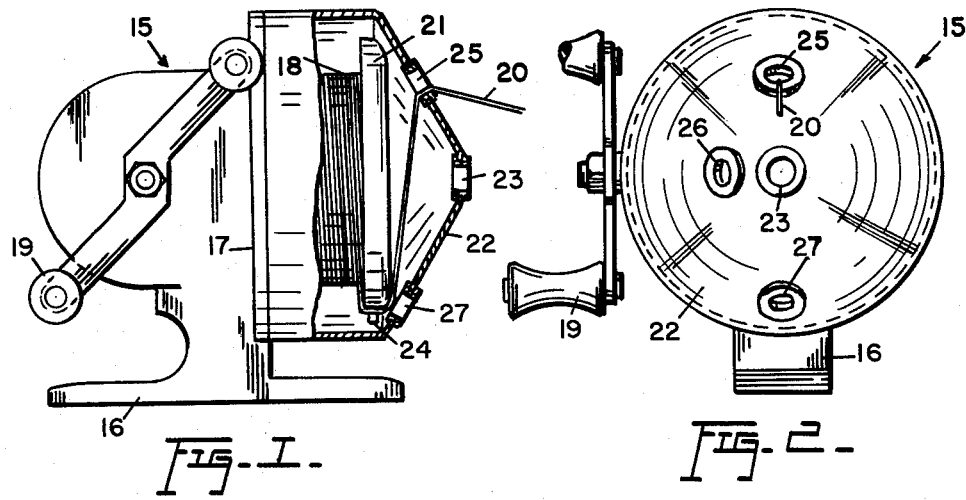
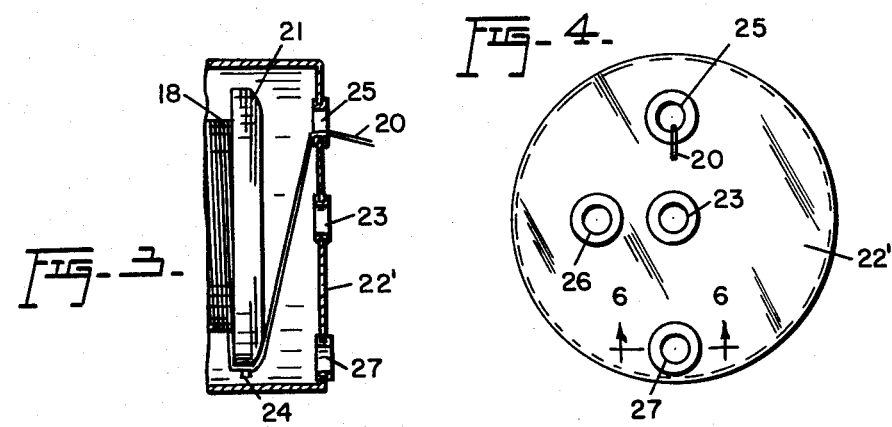
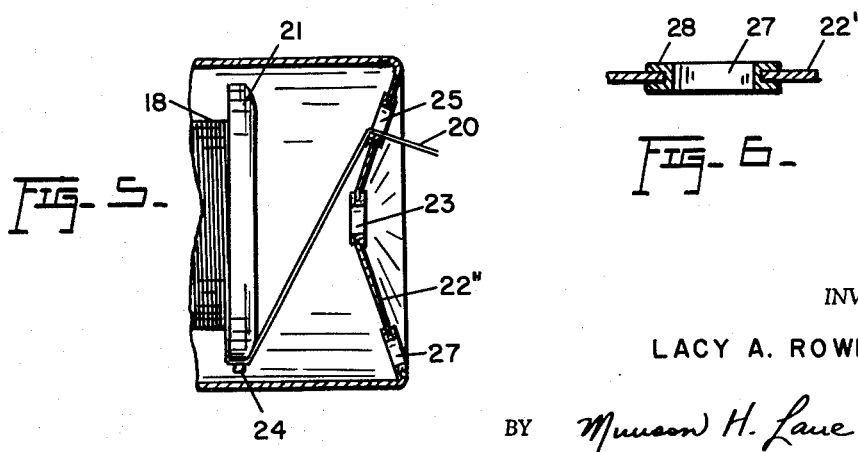
INVENTOR
LACY A. ROWE
BY Munson H. Lane
ATTORNEY

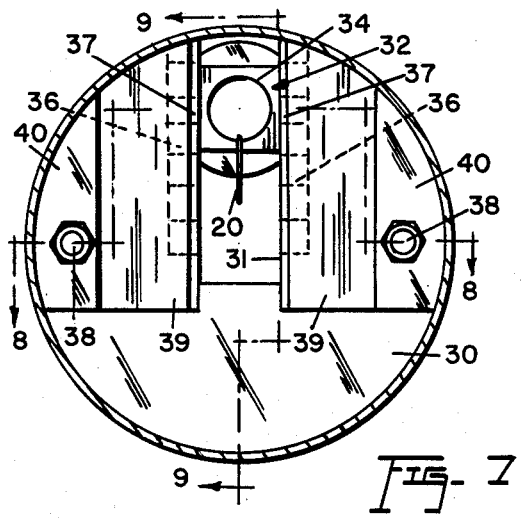
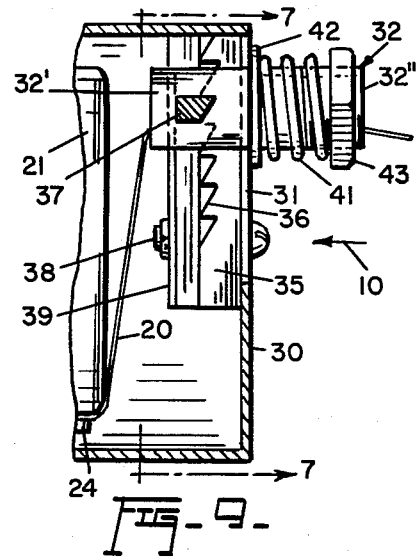
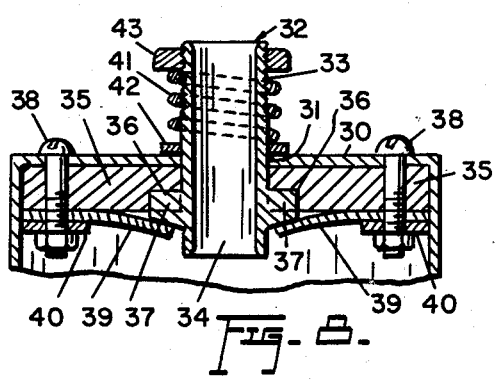
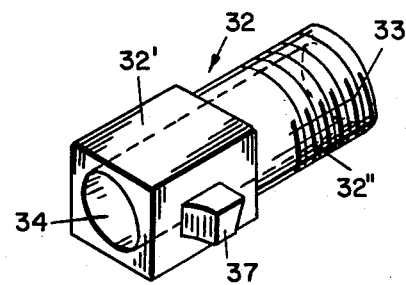
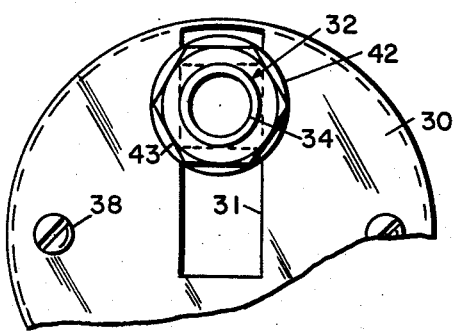
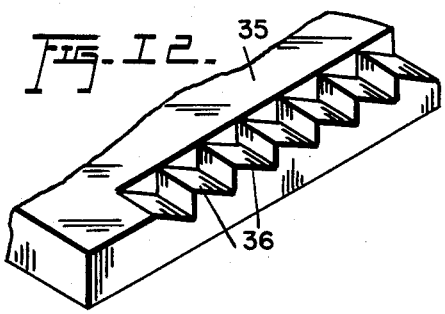

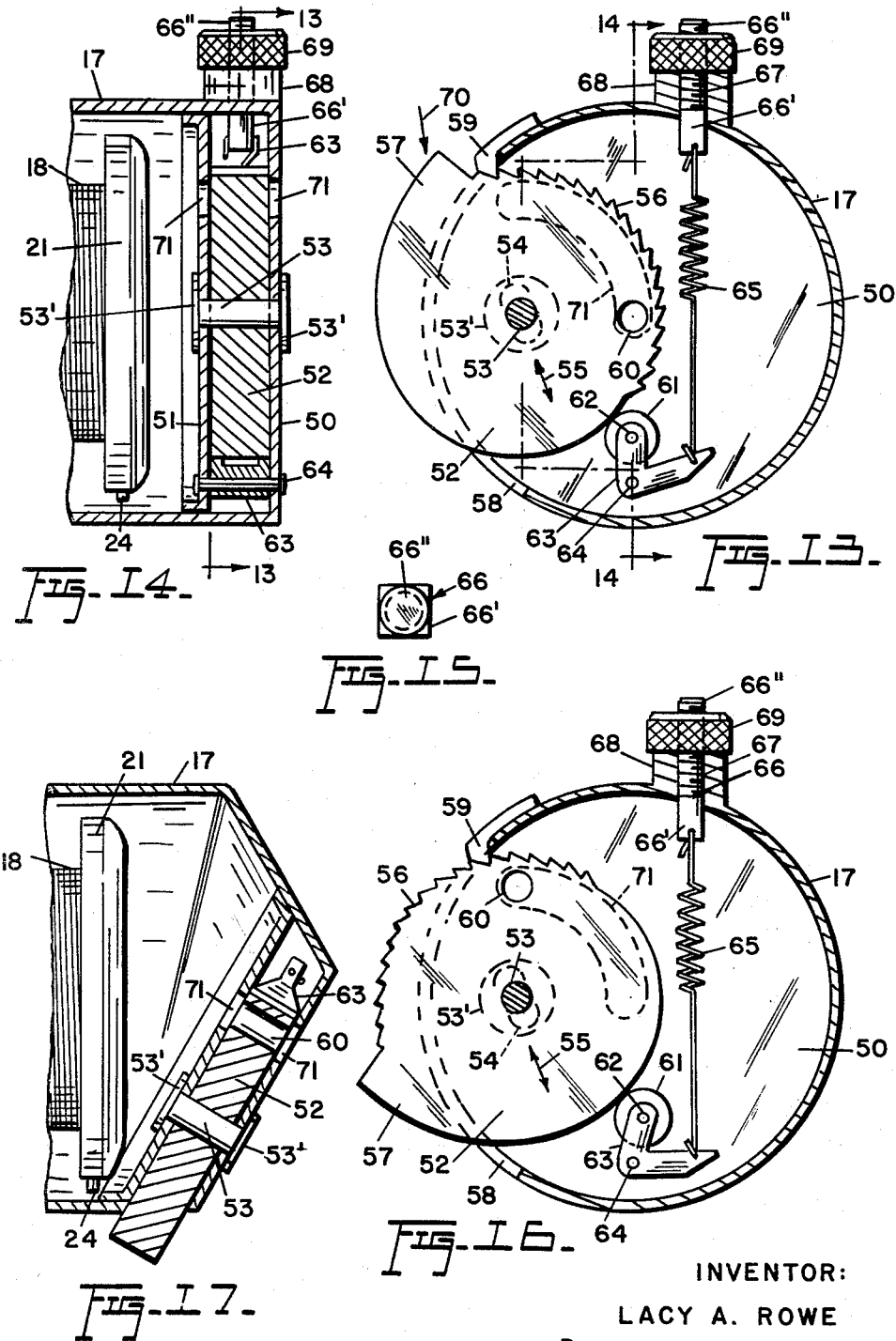

Jan. 19, 1965   L. A. ROWE   3,166,267
SPINNING REEL
Filed Aug. 22, 1963   4 Sheets-Sheet 4
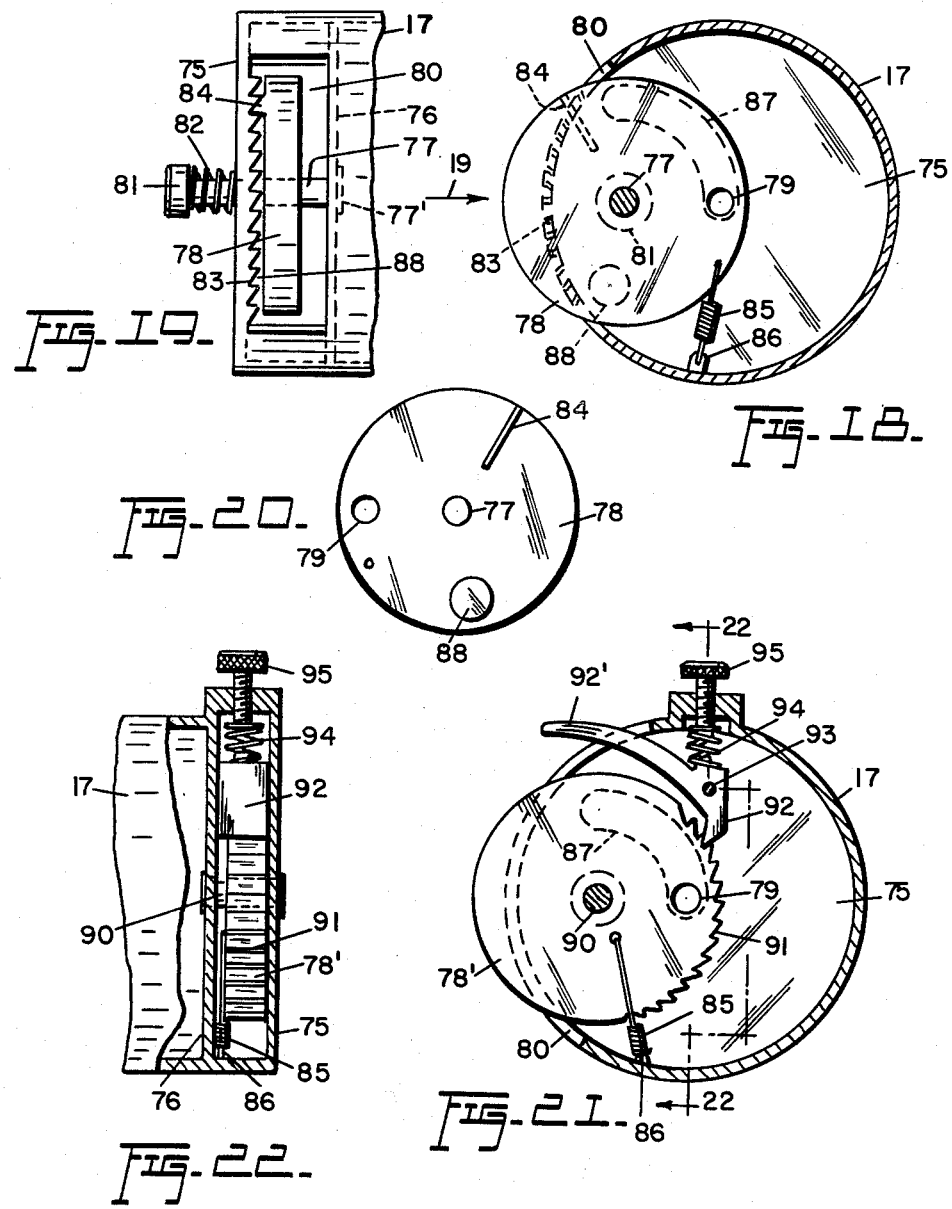
INVENTOR:
LACY A. ROWE
By Munson H. Lane
ATT'Y.

United States Patent Office 3,166,267
Patented Jan. 19, 1965

3,166,267
SPINNING REEL
Lacy A. Rowe, 1602 Lynchburg Turnpike, Salem, Va.
Filed Aug. 22, 1963, Ser. No. 303,835
12 Claims. (Cl. 242—84.2)

This invention relates to new and useful improvements in spinning reels such as are commonly used for fishing, and in particular the invention concerns itself with reels of this type wherein a line is wound on a stationary spool having a rotatable spooling member with a retractable pick-up pin which the line engages so that it is paid out or reeled in in a plane parallel to the axis of rotation of the spooling member.

While spinning reels of this type are conventional, the principal object of the invention resides in the provision of means whereby the line may be reeled in at an alternately fast and slow rate while the speed of rotation of the spooling member remains constant, whereby a substantial amount of jerking or tugging action may be automatically imparted to the line and to the lure at the end of the line for attracting the attention of fish.

This object is attained by the provision of line guiding means on the usual side cover or housing of the spool, such line guiding means being offset eccentrically from the axis of the spool, so that when the spooling member is rotated, the line engaging pick-up pin on the spool member moves alternately toward and away from the eccentric line guiding means, the line being reeled in at a relatively slower rate when the pin moves toward the line guiding means and at a relatively faster rate when the pin moves away from the guiding means, all during a constant speed of rotation of the spool member.

Another feature of the invention resides in selectively positioning the line guiding means at different radial distances from the axis of rotation of the spool member, whereby the amplitude or speed increase and decrease in the reeling rate may be varied as desired, or set at a constant rate by positioning the line guiding means concentrically with the axis of rotation of the spool member.

Another feature of the invention resides in the provision of means for releasably locking the line guiding means at a selected radial distance from the axis of the spool so that the line may be reeled in through the guiding means at alternately fast and slow rate during a normal reeling in procedure after the lure is cast, such locking means being automatically releasable by a predetermined amount of resistance to reeling in of the line, as when a fish is caught, in which event the line guiding means are automatically shifted to the spool axis to permit the line and the caught fish to be reeled in at a constant rate of speed without jerking or tugging.

Some of the advantages of the invention reside in its simplicity of construction, efficient operation, and in its adaptability to economical manufacture.

With the foregoing more important objects and features in view and such other objects and features as may become apparent as this specification proceeds, the invention will be understood from the following description taken in conjunction with the accompanying drawings, wherein like characters of reference are used to designate like parts and wherein:

FIGURE 1 is a side elevational view, partly in vertical section, showing one embodiment of the invention;

FIGURE 2 is an end view thereof;

FIGURE 3 is a fragmentary sectional view of the reel with a modified spool cover;

FIGURE 4 is and end view of the cover in FIGURE 3;

FIGURE 5 is a fragmentary sectional view of the reel with another modified spool cover;

FIGURE 6 is an enlarged, fragmentary sectional detail of the line guiding eyelets used in the embodiments of FIGURES 1-5;

FIGURE 7 is a cross-sectional view of a further modified embodiment, taken substantially in the plane of the line 7—7 in FIGURE 9;

FIGURE 8 is a fragmentary sectional view, taken substantially in the plane of the line 8—8 in FIGURE 7;

FIGURE 9 is a fragmentary sectional view, taken substantially in the plane of the line 9—9 in FIGURE 7;

FIGURE 10 is a fragmentary end elevational view, taken in the direction of the arrow 10 in FIGURE 9;

FIGURE 11 is a perspective view on an enlarged scale of the line guide member used in the embodiment of FIGURES 7-10;

FIGURE 12 is an enlarged, fragmentary perspective view of one of the ratchet plates used in the embodiment of FIGURES 7-10;

FIGURE 13 is a cross-sectional view of another modified embodiment, taken substantially in the plane of the line 13—13 in FIGURE 14;

FIGURE 14 is a fragmentary sectional view, taken substantially in the plane of the line 14—14 in FIGURE 13;

FIGURE 15 is an enlarged end view of an adjusting element used in the embodiment of FIGURES 13, 14;

FIGURE 16 is a sectional view, similar to that shown in FIGURE 13, but illustrating the parts in relatively different positions;

FIGURE 17 is a cross-sectional view in a fragmentary form, showing the embodiment of FIGURE 14 in a cone type housing cover;

FIGURE 18 is a cross-sectional view of another modified embodiment;

FIGURE 19 is a fragmentary side elevational view taken in the direction of the arrow 19 in FIGURE 18;

FIGURE 20 is an elevational view of the line guiding disc used in the embodiment of FIGURES 18, 19;

FIGURE 21 is a cross-sectional view of another modified form; and

FIGURE 22 is a fragmentary view, partly in section and partly in elevation, and taken substantially in the plane of the line 22—22 in FIGURE 21.

Referring now to the accompanying drawings in detail, more particularly to the embodiment of the invention shown in FIGURES 1-6, the general reference numeral 15 designates a spinning reel which includes the usual mounting base 16 supporting a housing 17 of a stationary reel or spool 18 which has a line 20 windable thereon by a conventional retractable pick-up pin on a conventional spooling member or flyer 21 in accordance with customary practice. The spooling member 21 is coaxial with the spool 18 and is rotatable by means of the usual crank or handle 19, it being understood that the line is wound on and unwound from the spool in a plane parallel to the spool axis or axis of rotation of the spooling member.

The housing 17 is provided with a cover 22 for the spool, which cover is disposed adjacent the spooling member 21. As shown in FIGURES 1 and 2, the cover 22 is frusto-conical with its minor end oriented outwardly or away from the spool. In FIGURES 3 and 4 the cover is flat as indicated at 22′, while in FIGURE 5 the minor end of the frusto-conical cover 22″ is oriented toward the spool. While the particular form of the cover is not important as far as the invention is concerned, it is significant to note that the invention is applicable to all cover shapes, as for example, the covers 22, 22′ and 22″.

In accordance with conventional practice the cover 22 is provided with a central opening 23 which is concentric with the spool axis. When the line 20 is passed through the opening 23 and the spooling member 21 is rotated at uniform speed so as to reel in the line, the line is reeled in at uniform speed inasmuch as the pick-up pin 24 which engages the line is always equidistant from the central opening 23 while the spooling member 21 is rotated.

The spool cover of the invention is also provided with the central opening 23, but in addition it is equipped with one or more similar openings 25, 26, 27 which are offset eccentrically by different radial distances from the axis of the spool. The line 20 may be passed selectively through the various openings, as for example, through the opening 25 as shown in the drawings. In such instance, when the spooling member 21 is rotated at substantially constant speed to reel in the line, the pin 24 will move alternately toward and away from the opening 25, moving toward the opening for approximately one-half the turn of the spooling member 21 and away from the opening during approximately the other half. It therefore follows that while the line is being reeled in and the pin 24 moves toward the opening 25, the line will pass through the opening at a slower rate than when the pin moves away from the opening, notwithstanding the constant speed of rotation of the spooling member. As a result, a periodic jerking or tugging action will be imparted to the line and to the lure (not shown) for attracting the attention of fish to the lure.

The amplitude or amount of increase and decrease of the rate at which the line passes through the opening 25 is governed by the radial distance of that opening from the spool axis, and by selectively threading the line through the various eccentrically offset openings 25, 26, 27, various amplitudes are obtainable. Also, the line may be threaded through the central opening 23, in which event the line is reeled in at constant speed, as in conventional practice. Although only three of the eccentric openings have been illustrated, others may of course be provided at various distances from the spool axis.

As is best shown in FIGURE 6, suitable eyelets 28 of wear-resistant material may be provided in the openings 23, 25, 26, 27 for smoothly guiding the line therethrough, without damaging the cover 22 by wear.

The modified embodiment of the invention shown in FIGURES 7–12 is based on the same principle of operation as the embodiment of FIGURES 1–6, except that it is provided with a single line guiding member which is adjustable radially toward and away from the spool axis so that the need of threading the line selectively through different openings is eliminated.

In this embodiment the cover 30 of the spool housing is provided with a radial slot 31 which slidably receives a line guiding member or sleeve 32. The latter has an inner portion 32' of a rectangular cross-section which fits slidably in the slot 31, while the outer portion 32'' of the sleeve is cylindrical and externally screw-threaded as at 33. The sleeve is formed with a central bore 34 for passage of the line 20.

Means are provided for releasably locking the sleeve 32 at a selected radial distance from the spool axis, or directly in concentric relation to the axis, these means comprising a pair of ratchet plates 35 which are positioned on the inside of the cover 30 and are provided with racks of teeth 36 at the opposite sides of the slot 31. The opposite sides of the rectangular inner portion 32' of the sleeve 32 are equipped with a pair of detents 37 which are engageable with the toothed racks 36 to lock the sleeve in the desired position. However, finger pressure may be applied to the outer end of the sleeve so as to slide the same axially inwardly in the slot 31 of the cover 30, thus disengaging the detents 37 from the racks 36 and permitting the sleeve to be slid radially in the slot, toward or away from the spool axis. The ratchet plates 35 are fastened to the inside of the cover 30 by suitable bolts 38 which also serve to secure a pair of spring plates 39 against the plates 35. The spring plates 39 bear against the detents 37 and thus bias the sleeve 32 outwardly so that the detents are engaged with the racks 36.

The outer side edges of the spring plates 39 are held against the ratchet plates 35 by a pair of batten plates 40 which are also held in place by the bolts 38, and it will be apparent from the foregoing that when the line 20 is passed through the bore 34 of the sleeve 32, the sleeve may be pressed axially inwardly against the resiliency of the plates 39 to disengage the detents 37 from the racks 36 and facilitate radial sliding of the sleeve in the slot 31, either to its concentric position with the spool axis, or to a selected radial distance therefrom, so that when the spooling member 21 is rotated, the line may be reeled in through the sleeve either at a constant rate of travel or with alternately faster and slower speed, with its amplitude being governed by the radial disposition or distance of the sleeve from the spool axis.

The resilient action of the spring plates 39 is assisted by a coil spring 41 which is positioned on the cylindrical outer portion 32'' of the sleeve, between a plain washer 42 and an adjusting nut 43. The spring 41 coacts with the plates 39 in biasing the detents 37 toward the racks 36, but since the resiliency of the coil spring 41 may be adjusted by tightening or loosening the nut 43, it is possible to set the device so that the sleeve 32 remains locked in a particular set position at a radial distance from the spool axis while the line 20 is reeled in after the lure is cast, with the jerking or tugging action being applied to the line as already explained. However, when a fish is caught on the line and presents a resistance to reeling in of the line, the tightening of the line under such a load will overcome the set resiliency of the spring means 39, 41 at a point of adjustment where the sleeve 32 will be automatically slid radially inwardly in the cover slot 31 by the increased tension of the line, until it reaches its central position concentric with the spool axis. In this manner the locking means of the sleeve will be automatically released and as the inward sliding movement of the sleeve takes place, the detents 37 will skip over the rack teeth 36. The rack teeth have a one-way inward slope to facilitate inward sliding of the sleeve but positively prevent outward sliding thereof, unless the sleeve is manually pressed axially inwardly at its outer end, as already mentioned. While the plates 35 have been shown as separate entities from the cover 30, they may be formed integrally therewith, if so desired.

FIGURES 13–16 illustrate another modified embodiment wherein the spool housing 17 is provided adjacent the end cover 50 with a partition 51 and a line guiding member in the form of a disc or cam 52 is rotatably positioned between the partition and the cover upon a pin or axle 53. The axle 53 is disposed in a pair of slots 54 formed in the partition 51 and cover 50, so that the disc 52 may be shifted as indicated at 55. The axle 53 is formed with enlarged heads 53' to retain the same in the slots. The circumferential edge of the disc 52 is in the form of a cam, a portion thereof being toothed as at 56 while another portion thereof 57, which may be referred to as a finger-piece, projects outwardly through a slot or opening 58 formed in the housing. A dog or detent 59 is secured to the housing and projects into the slot 58 to lockingly engage the cam or ratchet teeth 56. The disc 52 is also formed with a line guiding passage 60, the arrangement of parts being such that in one position of the disc as shown in FIGURE 13, the passage 60 is concentric with the axis of the spool 18. However, when the disc 52 is turned on its axle 53, the line passage 60 may be moved to a selected radially distant or spaced position from the spool axis, as for example, to the position shown in FIGURE 16. The disc is locked in a selected position by engagement of the dog 59 with the cam teeth 56, it being noted that the teeth have a one-way slope which permits the disc to turn so as to shift the line passage 60 toward the spool axis by increased tension on the line when a fish is caught, but prevent turning of the disc in the opposite direction unless the teeth 56 are disengaged from the dog 59 by manual pressure on the finger-piece 57 of the disc, as will be presently explained.

The disc 52 is resiliently biased to the centralized position shown in FIGURE 13 by a roller 61 which bears against the periphery of the disc and is supported on a pin 62 carried by a double-arm crank 63. The crank 63 is pivotally mounted on a pin 64 between the partition 51 and cover 50, and the other arm of the crank has connected thereto one end of a tension spring 65. The other end of the spring 65 is connected to an end portion 66' of an adjusting element or stem 66 which is slidably but non-rotatably positioned in a bore 67 of a rectangular cross-section formed in a boss 68 provided on the housing 17. The portion 66' of the stem 66 is also of a rectangular cross-section so as to prevent rotation of the stem in the bore, but the stem portion 66" is cylindrical and externally screw-threaded to receive an adjusting nut 69 which abuts the boss 68 as shown. It will be apparent from the foregoing that by tightening or loosening the nut 69, the tension of the spring 63 may be increased or decreased, thus varying the force by which the roller 61 biases the cam or disc 52 to the centralized position of the line guiding passage 60, shown in FIGURE 13. When the disc 52 is to be turned so as to move the passage 60 away from the axis of the spool, manual pressure is exerted in the direction of the arrow 70 on the finger-piece 57, thus disengaging the cam teeth 56 from the dog 59 while the disc 52 is being pressed, shifting of the disc being facilitated, of course, by movement of the disc axle 53 in the slots 54.

It will be observed that the cover 50 and the partition 51 are provided with arcuate slots 71 which are concentric with the disc axle 53 and are in register with the line passage 60, so that regardless of the particular setting of the disc, the line may pass from the spool 18 through the partition 51, disc passage 60 and the cover 50 to the outside of the housing. The partition 51 prevents the line inside the housing from becoming entangled with the mechanism of the invention.

FIGURES 18–20 illustrate another modified embodiment wherein the spool housing 17 has a cover 75 and a partition 76 apertured to slidably and rotatably receive a shaft 77 on which is mounted a line guiding disc 78 having a line passage 79. The disc 78 is circular and projects outwardly through a slot or opening 80 in the housing, this opening being sufficiently wide to enable the disc to be shifted axially during sliding of the shaft 77. The inner end of the shaft is provided with a head 77' while its outer end also has a head 81 and a compression spring 82 is provided on the shaft between the head 81 and the cover 75 to bias the shaft and the disc 78 in the direction of the cover. The housing 17 is provided at one side edge of the opening 80 with a set of ratchet teeth 83, while the side of the disc facing the cover is equipped with a bar-like detent 84 which is lockingly engageable with the ratchet teeth, being biased into engagement therewith by the action of the compression spring 82. It will be apparent that the disc 78 may be turned so that the line passage 79 is at the spool axis as shown in FIGURE 18, or at a radial spacing therefrom, as desired. A tension spring 85 is connected to the disc 78 and to a lug 86 in the housing for rotatively biasing the disc to the centralized position of the line passage 79. The cover 75 and the partition 76 are formed with arcuate slots 87 in register with the line passage 79 in all positions or settings of the disc. In order to prevent any distortion or misalignment of the disc such as would undesirably disengage the detent 84 from the ratchet teeth 83, a pressure pad 88 is provided on the disc and slidably engages on the inside surface of the cover 75.

FIGURES 21 and 22 illustrate still another modified form of the invention, wherein the line guiding disc 78', similar to the disc 78 and provided with a line passage 79, is mounted on a shaft 90 between the cover 75 and partition 76. The disc 78' is formed with ratchet teeth 91 along a portion of its circumference and there is provided a pawl 92 on a pin 93 between the cover and partition for engagement with the ratchet teeth, as shown. The pawl 92 has a finger-piece 92' which, like the disc 78', projects outwardly from the housing through the opening 80, the pawl 92 being pressed into engagement with the teeth 91 by a compression spring 94, the tension of which is adjustable by means of a suitable screw 95 carried by the housing.

It will be appreciated that although the embodiments of FIGURES 18–20 and 21–22 have been shown in conjunction with housing covers of the flat type, they may be also utilized with cone type housing covers, as exemplified in FIGURE 17 in connection with the embodiment of FIGURES 13–16.

While in the foregoing there have been described and shown the preferred embodiments of the invention, various modifications may become apparent to those skilled in the art to which the invention relates. Accordingly, it is not desired to limit the invention to this disclosure and various modifications and equivalents may be resorted to, falling within the spirit and scope of the invention as claimed.

What is claimed as new is:

1. In a spinning reel, the combination of a line carrying spool, a rotatable spooling member with a retractable line engaging pick-up pin, and line guiding means disposed adjacent said member and offset eccentrically from the axis of rotation thereof, whereby said pick-up pin may move toward and away from said guiding means for reeling in of a line through the guiding means at alternately fast and slow rate while said member is rotated at substantially constant speed.

2. In a spinning reel, the combination of a line carrying spool, a rotatable spooling member with a retractable line engaging pick-up pin, and line guiding means disposed adjacent said member, said guiding means being movable from a point concentric with the axis of rotation of said member to selected points spaced radially away from the axis of rotation, whereby when said guiding means are disposed at the axis of member rotation said pick-up pin may travel in a circular path around the guiding means for reeling in of a line at constant speed, and whereby when the guiding means are spaced radially from the axis of rotation said pick-up pin may move toward and away from the guiding means for reeling in of a line through the guiding means at alternately fast and slow rate while said member is rotated at substantially constant speed.

3. In a spinning reel, the combination of a line carrying spool, a rotatable spooling member with a retractable line engaging pick-up pin, and a spool cover disposed adjacent said member, said cover being provided with a line guiding opening offset eccentrically from the axis of rotation of said member, whereby said pick-up pin may move toward and away from said guiding means for reeling in of a line through the guiding means at alternately fast or slow rate while said member is rotated at substantially constant speed.

4. In a spinning reel, the combination of a line carrying spool, a rotatable spooling member with a retractable line engaging pick-up pin, and a spool cover disposed adjacent said member, said cover being provided with a first line guiding opening at the axis of rotation of said member and with a second line guiding opening offset eccentrically from the axis of rotation, said line being extendable selectively through said first and second openings, whereby the line may be reeled in through the first opening at constant speed or through the second opening at alternately fast and slow rate while said member is rotated at substantially constant speed.

5. In a spinning reel, the combination of a line carrying spool, a rotatable spooling member with a retractable line engaging pick-up pin, a spool cover disposed adjacent said member and provided with a slot extending outwardly from a point coincident with the axis of rotation of said member, and line guiding means carried by said cover in register with said slot, said guiding means being movable from a point concentric with the axis of spooling member rotation to selected points spaced radially away from the rotation axis, whereby rotation of the spooling member at substantially constant speed may selectively cause the line to be reeled in at a constant rate or at an alternately slow and fast rate.

6. The device as defined in claim 5 together with means for releasably locking said line guiding means in an adjusted position.

7. The device as defined in claim 5 together with means for releasably locking said line guiding means in an adjusted position, releasing of said locking means for returning the line guiding means to the axis of spooling member rotation being responsive to tensioning of the line.

8. The device as defined in claim 5 together with means for releasably locking said line guiding means in an adjusted position, releasing of said locking means being responsive to tensioning of the line, and resilient means biasing said guiding means toward the axis of spooling member rotation upon releasing of said locking means.

9. The device as defined in claim 5 wherein said line guiding means comprise a guide member slidably mounted in said slot of said cover and provided with a line passage therethrough.

10. The device as defined in claim 5 wherein said line guiding means comprise a guide member rotatably mounted in said cover and formed with a line passage in alignment with said slot.

11. The device as defined in claim 5 wherein said line guiding means comprise a guide member slidably mounted in said slot of said cover and provided with a line passage therethrough, and ratchet means for releasably locking said guide member in a selected position.

12. The device as defined in claim 5 wherein said line guiding means comprise a guide member rotatably mounted in said cover and formed with a line passage in alignment with said slot, and ratchet means for releasably locking said guide member in a selected position.

References Cited by the Examiner

UNITED STATES PATENTS

| 2,561,935 | 5/48 | McCash | 242—84.2 |
| 2,630,978 | 3/53 | Skarbek | 242—84.2 |
| 2,862,679 | 12/58 | Denison et al. | 242—84.2 |

FOREIGN PATENTS 558,986  6/58  Canada.

MERVIN STEIN, *Primary Examiner.*